Patented May 24, 1927.

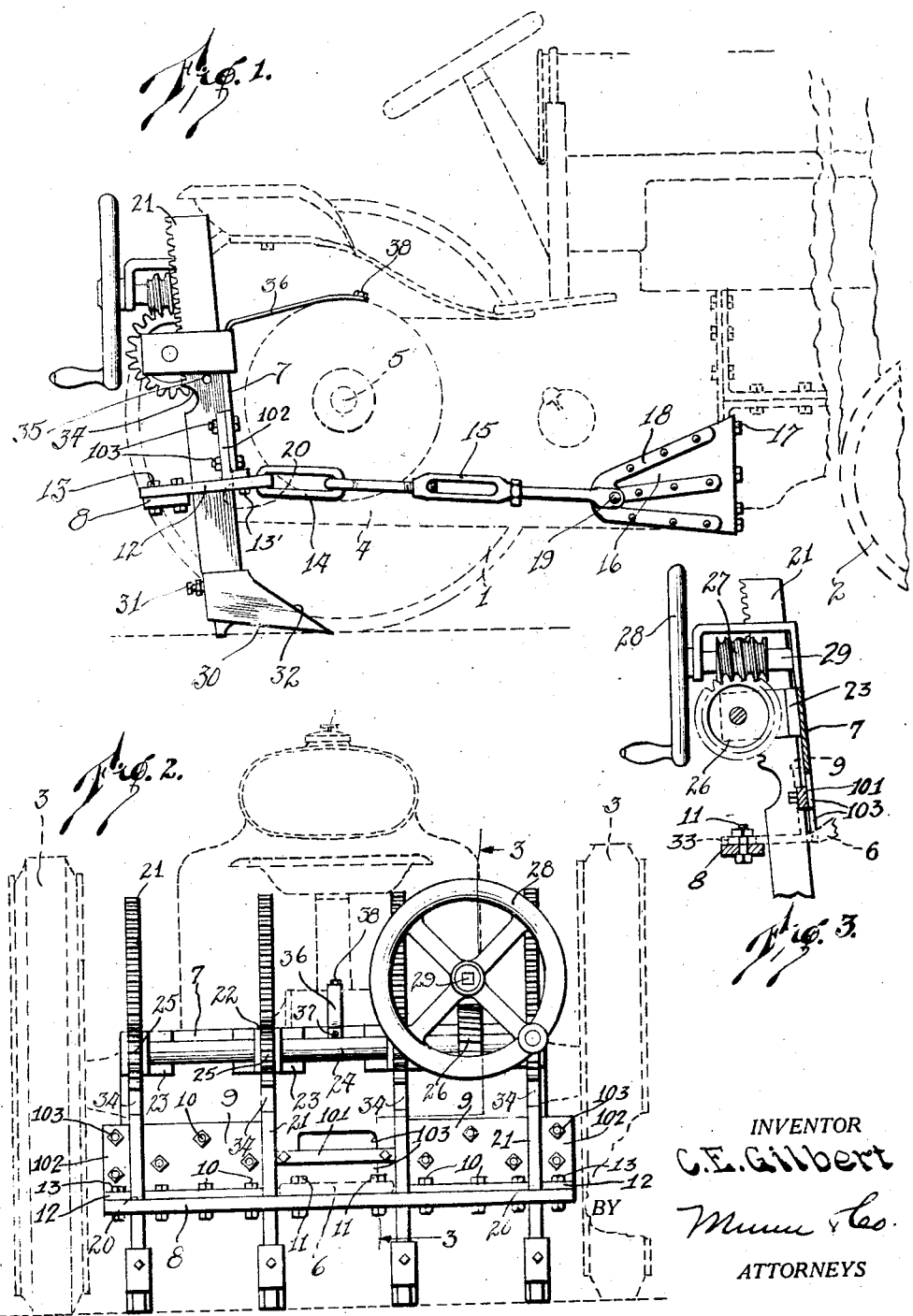

1,629,784

UNITED STATES PATENT OFFICE.

CLARENCE E. GILBERT, OF ABERDEEN, SOUTH DAKOTA.

SCARIFIER.

Application filed September 2, 1924. Serial No. 735,470.

My invention relates to improvements in scarifiers, and it consists in the combinations, constructions, and arrangements herein described and claimed.

An object of my invention is to provide a scarifier which is adapted to be quickly attached to a standard tractor with but slight alterations being necessary in the latter, and which may be removed when desired so as to permit the tractor to be used in the ordinary manner.

A further object of my invention is to provide a scarifier in which the teeth of the scarifier are positioned with respect to the tractor, so as to remain in the same position with respect to the ground while the front wheels of the tractor move vertically with respect to the rear wheels of the tractor, due to the unevenness of the ground over which the tractor is traveling.

A further object of my invention is to provide a scarifier in which the teeth may be swung with respect to the ground, so as to cause the teeth to dig more deeply into the ground or to dig a more shallow groove in the ground.

A further object of my invention is to provide a scarifier in which the teeth of the scarifier may be moved toward or away from the surface of the ground by a manually controlled mechanism which may be operated by the driver, who at the same time is operating the tractor.

A further object of my invention is to provide a scarifier which is extremely simple in construction, durable, and efficient for the purpose intended, and which is not likely to get out of order easily.

Other objects and advantages will appear in the following specification, and the novel features of the invention will be particularly pointed out in the appended claims.

My invention is illustrated in the accompanying drawings forming a part of this application in which—

Figure 1 is a side elevation of the device as shown operatively attached to a tractor.

Figure 2 is a rear elevation of the device, and

Figure 3 is a section along the line 3—3 of Figure 2.

In carrying out my invention I make use of a tractor, indicated generally at 1, this tractor being provided with front wheels 2 and rear wheels 3. The housing 4 of the rear axle 5 of the tractor is provided with a drawbar 6 to which the scarifier may be attached.

The scarifier comprises a supporting member such as a plate 7 which is secured to a guide member or plate 8 by means of two angle irons 9. The angle irons 9 are spaced far enough apart to permit the draw-bar 6 to pass therebetween, as shown in Figure 2. The inner edges of the angle irons 9 abut against the racks 21. A reinforcing strip 101 is secured by means of bolts to the plate 7 and has its ends abutting two of the racks 21. The outer edges of the two angle irons 9, i. e., the edges projecting toward the wheels 3 abut the outermost racks 21. Small angle irons 102 are disposed at the extremities of the plate 7, are secured to the plate 7 by bolts 103, and have their horizontal portions secured to strips 12 by bolts 13'. It will therefore be seen that the angle irons 9, the angle irons 102, and the strip 101 form guides for the racks 21. The plate 7 has a recess 103 therein, this recess being widened at a point even with the under edge of the strip 101 for receiving the drawbar 6. The angle irons 102 are secured to projections of the plate 7 by means of the bolts 103. In the present showing of the device I have illustrated the angle irons 9 as being secured to the plates 7 and 8 by means of bolts 10, but it is obvious that this structure may be changed, if desired, without departing from the spirit and scope of my invention. The plate 8 is secured to the drawbar 6 by means of bolts 11. Strips 12 are disposed at the ends of the guide member 8 and are secured thereto by bolts 13. The strips have their free ends connected to the casing or housing 4 by means of chains 14. A turnbuckle 15 is provided in each chain 14 so as to take up any slack in the chain. It will be noted from Figure 1 that the triangular shaped plates 16 are riveted to the housing 4 by means of the bolts 17 that normally connect the engine block to the housing 4. Reenforcing members 18 are riveted to the triangular strips 16 and in turn have an opening through which a pin 19 is disposed. The turnbuckle 15 is connected to the pin 19, whereby a connection is made between the housing 4 and the ends of the scarifier. It should be noted that two chains 14 and two strips 16 are provided in the present form of the device, one chain 14 being disposed on each side of the housing 4.

The plate 8 and the angle irons 9 and 102, and the strip 101 provide guide ways 20 between which racks 21 are slidably disposed. The guide ways 22 are provided at the top of the plate 7 and receive the racks 21. The guide ways 22 are provided by small angle irons 23 which project from the plate 7. The angle irons are provided with openings through which a shaft 24 extends. The shaft 24 is provided with gears 25 which are keyed to the shaft and which are received between the parts of the angle irons and are in mesh with the teeth in the racks 21. A master gear 26 is mounted upon the shaft 24 and is in mesh with a worm gear 27. A control handle 28 is mounted upon the shaft 29 which carries the worm 27.

It will be noted from Figure 1 that the lower ends of the racks 21 are provided with teeth 30 that are secured to the racks by means of bolts 31. The teeth 30 have cutting edges 32 which are inclined with respect to the ground and are shaped so as to dig into the ground when the tractor is moved. It is obvious from the structure of the device described that when the hand wheel 28 is rotated it will raise all of the cutters 30 simultaneously, or will lower them into the ground.

From the foregoing description of the various parts of the device the operation thereof may be readily understood. As mentioned heretofore the cutters 32 may be tilted with respect to the tractor so as to cause the cutters to gouge into the ground. This is accomplished by means of loosening the bolts 11 and either loosening or tightening the turnbuckles 15 so as to permit the plate 8 to swing angularly with respect to the draw bar 6. As shown in Figure 3, the bolts 11 are received in slots 33 in the drawbar 6 and are therefore adapted to swing slightly so as to permit the plate to be swung into a slight angle with respect to the drawbar 6. Of course, the plate 8 and the plate 7, together with the angle irons 9 will swing with respect to the draw bar 6 when the bolts 11 are loosened and the turnbuckles 15 are adjusted. In use, the operator merely turns the handle 28 so as to raise or lower the cutters 30 in order to have the cutters dig the proper distance into the ground. The cutters are positioned directly below the axle 5 so as to permit the front wheels to raise or lower with respect to the rear wheels 3, and yet not to raise or lower the cutters appreciably with respect to the ground. It should be noted that when the cutters 30 are disposed directly below the axle 5 a slight movement of the front wheels 2 will swing the cutters in an arc and the cutters would have to be moved a considerable distance before they would be raised with respect to the ground. In the standard type of scarifier, the cutters are disposed a considerable distance behind the rear axle of the tractor and are therefore raised or lowered when the front wheels of the tractor are moved over bumps or drop into depressions in the road. In case the front wheels are moved upwardly the cutters are inclined so that they would be raised out of the ground and it is then a very hard matter to again cause the cutters to dig back into the ground. In case the front wheels drop with respect to the rear wheels the cutters will be inclined downwardly so as to dig more deeply into the ground and prevent the tractor from pulling the cutters through the ground. This disadvantage is obviated in the present device.

With the form of the device described in the present application, the cutters are disposed directly beneath the rear axle 5 and are therefore not affected by the vertical movement of the front wheels 2. This is one of the principal advantages over the standard type of scarifier. The cutters or teeth 30 may be removed, if desired, and new ones adjusted in place of the ones removed. The entire device is simple and compact and may be quickly applied to a standard tractor. There is no alteration needed of any kind, and the only thing necessary for the operator to do is to bolt the triangular plates 16 to the housing 4 and to secure the plate 8 to the draw bar 6 by means of the bolts 11. The device is now ready for instant use. The device may be removed after use so as to permit the tractor to be used in the ordinary manner. In Figure 1 it will be noted that I have provided recesses 34 in the racks 21. These recesses are disposed at the lowermost ends of the serrated portions of the racks. When the hand wheel 28 is rotated so as to raise the racks 21 the gears 25 will mesh with the teeth of the serrated portions and will raise the racks until the gears are disposed in the recesses 34. Further movement or rotation of the hand wheel 28 will not raise the racks, due to the fact that the gears 25 are allowed to rotate freely within the recesses 34.

This construction not only provides a simple stop for the upward movement of the racks 21, but also provides a novel means whereby I can eliminate one or more of the racks from service. This is accomplished by raising the desired rack to be eliminated until the gear 25 which meshes with this rack is received in the recess 34 of the rack. When the rack is in this position an opening 35 in the rack is positioned directly above the top of one of the angle irons 23 which forms a part of the guide for the rack. A pin, not shown, may be inserted through this opening and thus bear upon the top of the angle irons 23 so as to hold the rack in inoperative position. The other racks may now be lowered for bringing their cutters into contact with the road. The device may now be operated in the ordinary manner and will function as heretofore described except for the fact that one of the racks or more, if the operator so desires, are held in inoperative position.

In case the driver wishes to disengage the teeth from the ground he reverses the tractor, whereupon the cutters will be pulled free from the ground and he may then rotate the hand wheel 28 so as to raise the cutters off from the ground. In reversing the tractor however, the rear portions of the cutters travel back through the grooves cut and are very apt to come into engagement with the side walls of the groove and thus place a strain upon the rear part 7 of the scarifier. This strain is likely to cause the plate 7 to swing slightly and to place a great strain upon the bolts 11. In order to overcome this tendency, I provide a steel strap 36 which is bolted to the plate 7, at 37, and to the housing 4 at 38. This strap prevents the upper edge of the plate 7 from moving away from the housing 4 as the tractor is backed so as to free the cutters 30 from the ground.

I claim:

1. The combination with a standard tractor having a drawbar, of a scarifier removably secured to said drawbar, cutters carried by said scarifier, said cutters being positioned directly below the rear axle of the tractor whereby said cutters will remain in substantially the same plane as the front wheels of the tractor pass over uneven ground, and means for preventing lateral movement of said cutters with respect to the tractor, said means comprising adjustable members secured to the ends of the scarifier and having their free ends secured to the tractor, said members being adapted to prevent the swinging of the scarifier rearwardly.

2. In a device of the type described, a frame, racks carried by said frame, cutters removably secured to said racks, pinions for moving said racks, a shaft for carrying all of said pinions, and a worm gear connection for operating said shaft, whereby said cutters may be simultaneously raised or lowered.

3. In a device of the type described, a frame, racks carried by said frame, cutters removably secured to said racks, pinions for moving said racks, a shaft for carrying all of said pinions, a worm gear connection for operating said shaft, whereby said cutters may be simultaneously raised or lowered, said racks having recesses therein for loosely receiving the pinions when said racks have been moved into a predetermined position, and means for holding one or all of the racks in said position, whereby one or all of the racks may be held in inoperative position.

4. A device of the type described adapted to be connected to the drawbar of a tractor, means securing said device to said drawbar, chains connecting said device to the housing of the tractor, fastening members secured to the housing by the bolts of the housing and being secured to the chains, whereby a solid connection between the device and the tractor is afforded, teeth, means connecting said device to the housing for preventing the movement of said teeth with respect to said tractor when said tractor is moved rearwardly, the teeth carried by said device being positioned directly beneath the rear axle of the tractor when the device is applied thereto.

CLARENCE E. GILBERT.